United States Patent [19]

Barbin

[11] E Re. 31,552

[45] Reissued Apr. 10, 1984

[54] ELECTRON BEAM AND DEFLECTION YOKE ALIGNMENT FOR PRODUCING CONVERGENCE OF PLURAL IN-LINE BEAMS

[75] Inventor: Robert L. Barbin, Lancaster, Pa.

[73] Assignee: RCA Corporation, New York, N.Y.

[21] Appl. No.: 218,367

[22] Filed: Dec. 19, 1980

Related U.S. Patent Documents

Reissue of:

[64] Patent No.: 3,789,258
Issued: Jan. 29, 1974
Appl. No.: 245,862
Filed: Apr. 20, 1972

[30] Foreign Application Priority Data

Jan. 14, 1972 [GB] United Kingdom ..... 01779/72

[51] Int. Cl.[3] ..... H01J 29/50

[52] U.S. Cl. ..... 315/13 C; 315/370; 315/368

[58] Field of Search ..... 315/13 C, 13 CG, 370, 315/368

[56] References Cited

U.S. PATENT DOCUMENTS

| | | |
|---|---|---|
| 2,611,003 | 9/1952 | Friend . |
| 2,690,518 | 9/1954 | Fyler et al. . |
| 2,735,031 | 2/1956 | Woodbridge . |
| 2,859,378 | 11/1958 | Gundert et al. . |
| 2,887,598 | 5/1959 | Benway . |
| 2,931,932 | 4/1960 | Haigh et al. . |
| 2,957,106 | 10/1960 | Moodey . |
| 3,226,588 | 12/1965 | Barkow et al. . |
| 3,302,050 | 1/1967 | Obert et al. . |
| 3,325,675 | 6/1967 | Sanford . |
| 3,377,512 | 4/1968 | McLeod . |
| 3,404,228 | 10/1968 | McLeod, Jr. et al. . |
| 3,497,843 | 2/1970 | Collie, Jr. . |
| 3,594,600 | 7/1971 | Murata et al. . |
| 3,605,053 | 9/1971 | Anthony . |
| 3,637,930 | 1/1972 | Meier . |
| 3,688,231 | 8/1972 | Van Der Heijde et al. . |

FOREIGN PATENT DOCUMENTS

| | | |
|---|---|---|
| 145540 | of 0000 | Australia . |
| 1762315 | of 0000 | Fed. Rep. of Germany . |
| 1504442 | of 0000 | France . |
| 361669 | of 0000 | Japan . |
| 448495 | of 0000 | Japan . |
| 3912806 | of 0000 | Japan . |
| 3919823 | of 0000 | Japan . |
| 4515123 | of 0000 | Japan . |
| 4630454 | of 0000 | Japan . |
| 4630860 | of 0000 | Japan . |

OTHER PUBLICATIONS

Denpa Kagaku (Radio Wave Science–Oct. 1970), pp. 83–100.

Sony Service Manual for KV-1710 USA and Canada Model Color Television Receiver (copyright 1971).

Sony Service Manual for Model KV-1810U Japanese Domestic Market Color Television Receiver (p. B14).

NHK Gijutsu Kenkyu, vol. 17, No. 8.

*Primary Examiner*—Peter A. Nelson
*Attorney, Agent, or Firm*—John Farley

[57] ABSTRACT

In a color television display system in which a plurality of horizontal in-line electron beams are directed toward color phosphor elements of a color picture tube, substantial convergence of the beams at all points on a scanned raster is achieved by transversely positioning the deflection yoke relative to the picture tube while maintaining substantial parallelism between the central longitudinal axes of the yoke and picture tube.

9 Claims, 5 Drawing Figures

ELECTRON BEAM AND DEFLECTION YOKE ALIGNMENT FOR PRODUCING CONVERGENCE OF PLURAL IN-LINE BEAMS

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for aligning a plurality of electron beams with the magnetic field of a deflection yoke for producing convergence of the beams on a scanned raster.

The most common type of color television receiver in current use utilizes a delta gun shadow mask picture tube in which three electron beams emanating from the apices of a triangle formed by the guns are deflected to scan a raster on the phosphor screen. It is essential that the electron beams remain converged at all points on the screen so that the three different color rasters are superimposed. To this end it is common practice to utilize an electromagnetic dynamic convergence correction apparatus disposed around the neck of the color picture tube in the region where the beams leave the gun. This convergence correction apparatus usually comprises three electromagnets disposed around three internal pole pieces of the picture tube, which electromagnets are energized at the line and field scanning rates for dynamically controlling the amount of correction imparted to the respective beams to ensure satisfactory convergence at all points on the screen. The waveforms applied to the electromagnets may be suitably adjusted for providing the desired correction. Although this dynamic correction apparatus performs satisfactorily, it is relatively complex and hence relatively expensive, thereby adding to the cost of the color television receiver. Furthermore, the complexity of the apparatus requires considerable time to be adjusted correctly.

Color television picture tubes utilizing three horizontal in-line electron beams have been used in some instances to replace the delta gun picture tubes to simplify the apparatus required to maintain convergence of the beams. For example, in a color television picture tube utilizing three horizontal in-line beams and a phosphor element viewing screen utilizing a pattern of vertical different color phosphor strips, apparatus providing dynamic convergence can be simplified, although dynamic convergence is still required. It is obviously desirable to provide a color television receiver which requires no dynamic convergence correction at all.

Accordingly, it is an object of this invention to provide a method of electron beam and deflection yoke alignment for producing convergence of plural in-line beams.

It is another object of this invention to provide apparatus for electron beam and deflection yoke alignment for producing convergence of plural in-line beams.

In accordance with the invention a method is provided of mounting a beam deflection yoke relative to a color picture tube including an electron gun for projecting a plurality of in-line electron beams toward a phosphor screen, comprising supporting the picture tube in a predetermined position, temporarily supporting the yoke loosely around the picture tube, operating the tube and yoke to project the beams toward the screen and to scan separate rasters thereon and simultaneously adjusting the transverse position of a yoke relative to the picture tube while maintaining substantial parallelism of the longitudinal axis of the yoke and the picture tube to achieve substantial convergence of the beams on the screen, and fixedly attaching the yoke to the picture tube in the adjusted position.

A system for converging a plurality of beams in a color television display system includes a color picture tube including a color phosphor element screen at one end thereof and an electron gun assembly within a neck portion of the tube at the other end thereof for producing a plurality of in-line beams. A deflection yoke adapted to be energized to cause the beams to scan rasters on the phosphor element screen has a smallest inner diameter larger than the outer diameter of the neck portion of the picture tube. Means are provided for allowing the deflection yoke to be adjusted in directions transvere to the central longitudinal axis of the picture tube while maintaining substantial parallelism between the central longitudinal axis of the yoke and the picture tube and for fixedly retaining the yoke in a position providing substantial convergence of the beams on the phosphor element screen.

The invention will be described more fully in the following description of a preferred embodiment of the invention and in the accompanying drawings, of which:

*FIG. 1 is a partial sectional view, taken horizontally along the central beam axis of the picture tube shown in FIG. 1;*

FIG. 6 is a partial sectional view, taken horizontally along the central beam axis of the picture tube of FIG. 1.*

DESCRIPTION OF THE INVENTION

Figure 1:
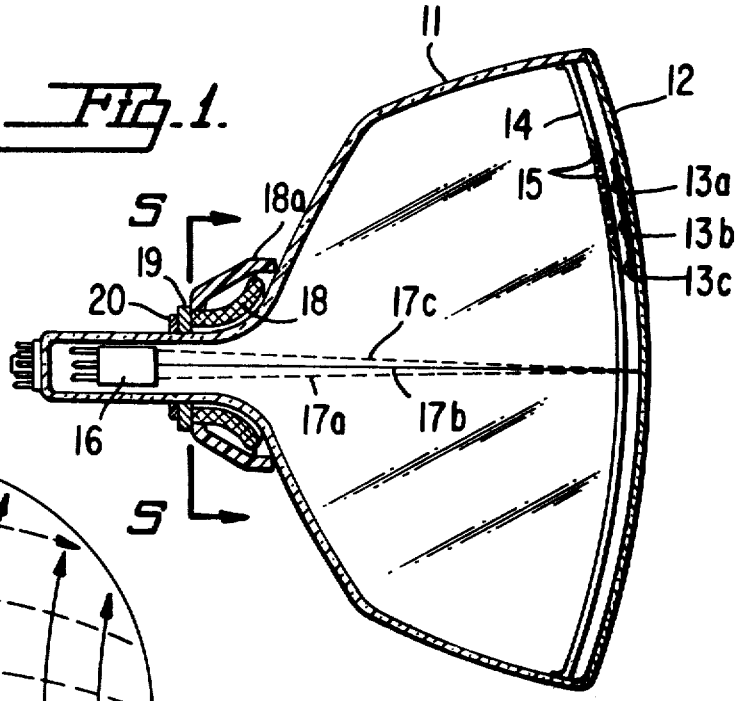
FIG. 1 illustrates a system according to the invention for producing convergence of a plurality of in-line beams.

FIG. 1 illustrates a system according to the invention for producing convergence of a plurality of in-line electron beams. FIG. 1 represents the main display components of a color television receiver. A color television picture tube comprises a glass envelope 11. At one end of envelope 11 is a transparent face plate 12 on the inside of which are repeating groups of blue, red and green phosphor elements 13a, 13b and 13c, respectively. Disposed a short distance from the phosphor elements is an aperture mask 14 containing therein a plurality of apertures 15. Disposed within a neck portion of envelope 11 at the other end of the picture tube is an electron gun assembly 16 for producing three horizontal in-line beams 17a, 17b and 17c. The beams are modulated in accordance with video signals to be respectively representative of blue, red and green color information of the televised scene. Disposed around the neck portion of the envelope of the picture tube and adjacent the flared portion of the envelope 11 is a deflection yoke 18 which, when suitably energized by sources of vertical and horizontal rate scanning currents, causes the electron beams 17a, 17b and 17c to scan respective rasters over the phosphor elements. Deflection yoke 18 is held in place by yoke mounting means 18a to be described in more detail subsequently.

Disposed around the neck region of the picture tube in the region where the electron beams leave electron gun assembly 16 are a static beam convergence assembly 19 and beam purity device 20. The static beam convergence assembly 19 may include a plurality of permanent magnets for statically converging the beams at the center of the phosphor screen. Beam purity device 20 comprises two annular magnetized rings which are simultaneously adjusted for achieving purity, i.e., to insure that the respective color representative beams land on their respective color phosphor elements.

Figure 6:
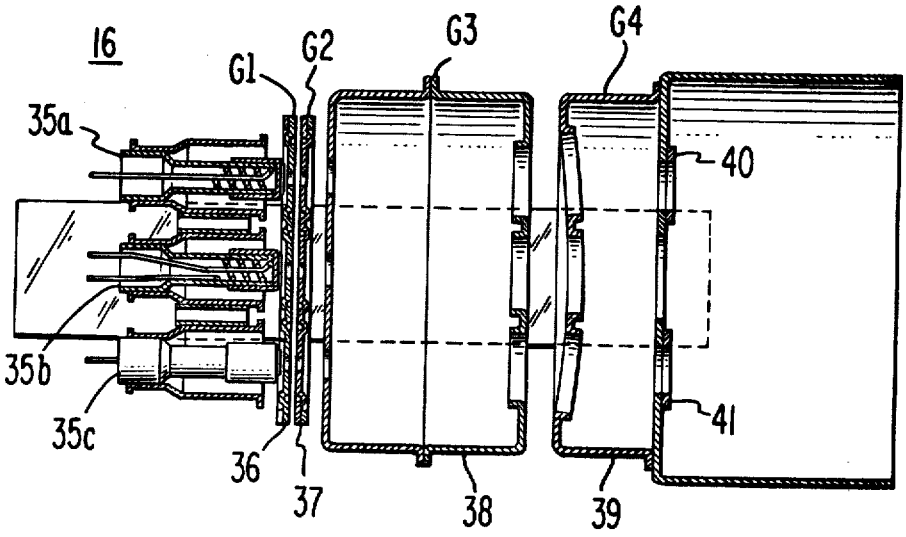
*FIG. 6 illustrates an electron gun assembly suitable for use in the system of FIG. 1.

In a preferred embodiment the phosphor elements 13a, 13b and 13c are vertical strips of phosphor material, and the apertures 15 are elongated slits also extending in a vertical direction. Such a vertical line phosphor element structure eliminates vertical registration problems because even with a slight misalignment of the beams in a vertical direction, a particular beam will still land on its intended color phosphor because the phosphor strips extend throughout the vertical dimension of the viewing face plate. However, vertical misalignment of the beams will cause a problem in convergence which, together with its solution, will be described subsequently. The arrangement thus far described in FIG. 1 is disclosed in detail in copending U.S. application Ser. No. 217,780, filed Jan. 14, 1972[,] for A. M. Morrell et al. and entitled "SELF-CONVERGING COLOR TELEVISION DISPLAY SYSTEM", *which was refiled June 29, 1973 as continuation application Ser. No. 374,831, now U.S. Pat. No. 3,892,996. In particular, the Morrell et al. application Ser. No. 217,780 discloses an electron gun assembly 16, illustrated in FIG. 6, that is suitable for use in the system of FIG. 1. Three separate cathodes 35a, 35b and 35c are provided for generating three electron beams. The electrons emitted by the cathodes are subsequently accelerated, formed into beams and focussed by the remaining electrodes including a G1 electrode 36, a G2 electrode 37, a G3 electrode 38 and a G4 electrode 39. Although not shown, it is to be understood that the cathodes and the other electrodes are retained in their relative positions by common suitable glass beading strips attached to the various electrodes. Electron gun assembly 16 provides the three electron beams 17a, 17b and 17c which converge at the center of the faceplate 12 of FIG. 1 in the absence of a deflection field provided by the deflection yoke 18. To achieve this converged condition the alignment and spacing of the various electrodes, particularly G3 and G4, relative to each other are critical. It should be noted that all of the electrodes have three apertures and are common to the three beams 17a, 17b and 17c. This monolithic type of construction greatly facilitates the building of a precision electron gun which produces the desired alignment of the beams particularly in the vertical direction. The spacing of the apertures in the G3 and G4 electrodes relative to each other enables the two outside beams 17a and 17c to converge on the center beam 17b at the viewing screen. Minor errors in beam alignment (convergence at the center of the viewing screen) are corrected by suitable adjustment of the static convergence assembly 19 referred to above. A suitable electron gun assembly of the type described is disclosed in more detail in copending application Ser. No. 217,758 filed concurrently herewith for Richard Hughes and entitled "In-Line Electron Gun For Color Picture Tube", now U.S. Pat. No. 3,772,554.*

Figure 2:
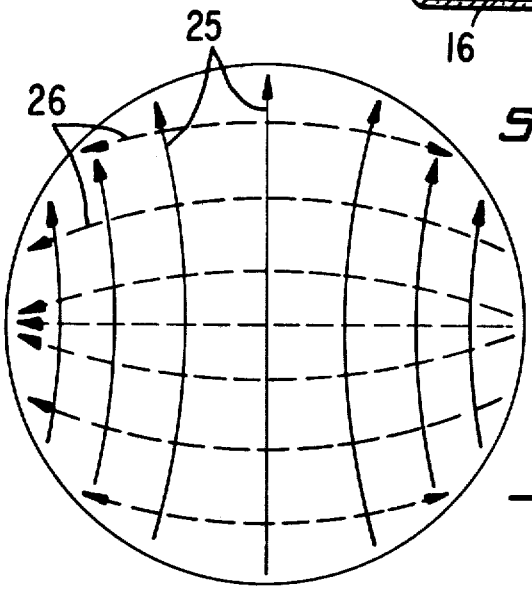
FIG. 2 illustrates a characteristic of a magnetic deflection field produced by the deflection yoke shown in FIG. 1.

FIG. 2 illustrates a characteristic of a magnetic deflection field produced by the deflection yoke shown in FIG. 1. As described in the aforementioned Morrell et al. application *Ser. No. 217,780*, the particular selection of the electron gun assembly 16 and the deflection yoke 18 will provide substantial convergence of the beams at all points on the scanned raster without requiring the use of dynamic convergence correction apparatus. The characteristics of a deflection yoke for achieving this are that it exhibit negative horizontal isotropic astigmatism and positive vertical isotropic astigmatism. FIG. 2 illustrates the net or dominant magnetic field produced by a yoke exhibiting these astigmatic characteristics. In FIG. 2 lines of flux 25 illustrate the horizontal magnetic field. The pincushion shape of the field is due to the negative horizontal isotropic astigmatism. This pincushion-shaped deflection field increases in strength with distance from the center along an axis parallel to the horizontal direction of deflection. At the same time this pincushion-shaped field decreases in strength along an axis perpendicular to the horizontal direction of the deflection.

In FIG. 2 lines of flux 26 illustrate the vertical magnetic deflection field produced by a deflection yoke exhibiting positive vertical isotropic astigmatism. This vertical field is barrel-shaped and the vertical barrel-shaped deflection field gets stronger along the horizontal axis and weaker along the vertical axis. A preferred embodiment of a deflection yoke exhibiting this type of field is disclosed in copending U.S. application Ser. No. 217,768, filed Jan. 14, 1972, for W. H. Barkow et al. and entitled "DEFLECTION YOKE FOR USE WITH IN-LINE ELECTRON GUNS."

The deflecting yoke magnetic field distribution described in conjunction with FIG. 2 is designed to converge perfectly aligned electron beams. If the beams are not properly aligned with the center of the yoke magnetic field, the beams will not be converged on the viewing screen. Misalignment of the beams relative to the yoke magnetic field could occur with electron gun misalignment within the picture tube, deflection yoke misalignment relative to the beams or the tube neck, or nonsymmetry of the deflection yoke coils. It can be generally stated that manufacturing variations in the electron gun assembly displacement within the picture tube or in the winding of the deflection yoke will result in misalignment of the beams relative to the yoke magnetic field. In a system such as described in FIG. 1 in which no dynamic convergence correction apparatus is utilized, the beams will not be converged unless steps are taken to align the beams with the magnetic field in accordance with the invention.

Figure 3A:
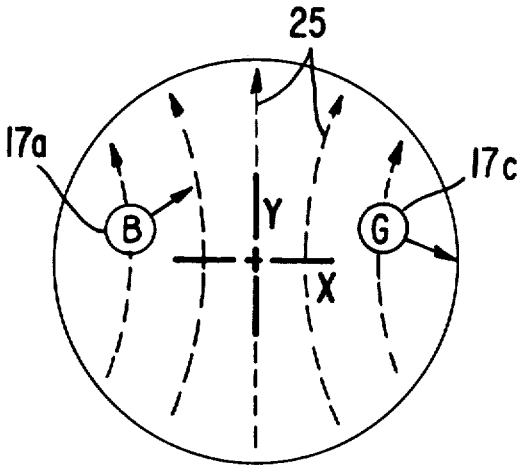
FIGS. 3 and 4 illustrate the effects of the magnetic deflection field of FIG. 2 on the two outside electron beams shown in FIG. 1; [and]

FIGS. 3 and 4 illustrate the effects of the magnetic deflection field of FIG. 2 on the two outside ones of the three in-line electron beams when the beams are misaligned relative to the deflection yoke magnetic field. FIG. 3a illustrates the condition in which the blue and green beams 17a and 17c are misaligned in a vertical direction relative to the center of the horizontal deflection field illustrated by the lines of flux 25. The dotted lines indicate the magnetic flux and the solid arrows that point away from the beams indicate the general direction and amount of beam displacement caused by the misaligned position of the beams. To simplify the illustrations in FIGS. 3 and 4, the center one of the three beams, red beam 17b, has been omitted because it can generally be stated that the effect on the center beam will be to cause it to lie between the outside blue and green beams.

In FIG. 3a the blue and green beams see the same strength magnetic field because they are equally displaced in a horizontal direction from the center of the field, but the directions are different such that, when the beams are deflected to the right, the blue beam is also deflected upward and the green beam is deflected downward. When deflected to the left (by reversing the indicated polarity of the magnetic field), the blue beam would be undesirably deflected downward and the green beam upward. The result is that along the horizontal or X-axis the blue beam will be low on the left side of the raster and high on the right with respect to the green beam. If the beams had been misaligned downward from the center axis rather than upward, the blue beam would be high on the left and low on the right relative to the green beam.

Figure 3B:
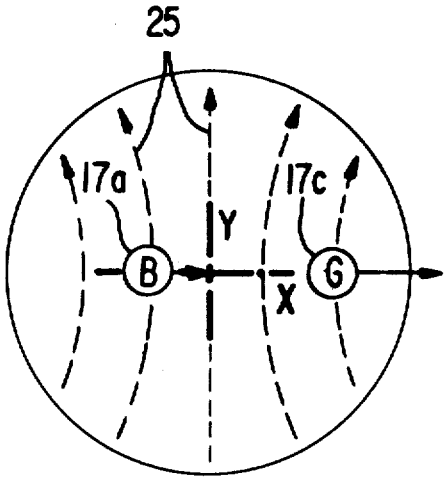

In FIG. 3b the blue and green beams are misaligned horizontally to the right in the horizontal deflection field 25. As described above, the pincushion-shaped horizontal deflection field increases in strength with distance from the center along the horizontal axis. Therefore, the misaligned green beam being farther from the center than the blue beam is in a stronger magnetic field and is deflected further. The result is that the green raster is wider than the blue raster. It can be seen that if the polarity of the deflection field were reversed such as when the beams are to be deflected to the right side of the raster, the green beam would be similarly deflected further than the blue. Had the beams been misaligned to the left of the center rather than to the right as illustrated, the green raster would be smaller than the blue raster.

Figure 4A:
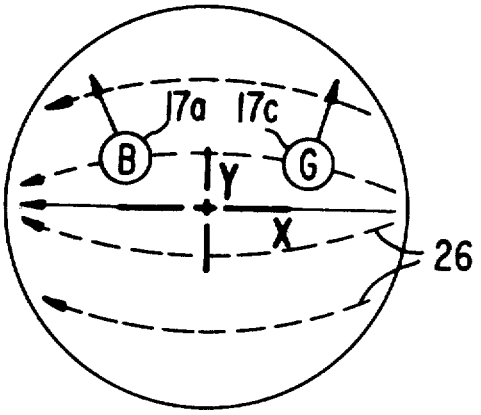

FIG. 4a illustrates the effect on the beams when they are misaligned vertically, in upward direction, under the influence of the vertical magnetic deflection field illustrated by the lines of flux 26. The blue beam will move to the left at the top of the raster and to the right at the bottom of the raster with respect to the green beam due to the direction of the magnetic flux lines.

Figure 4B:
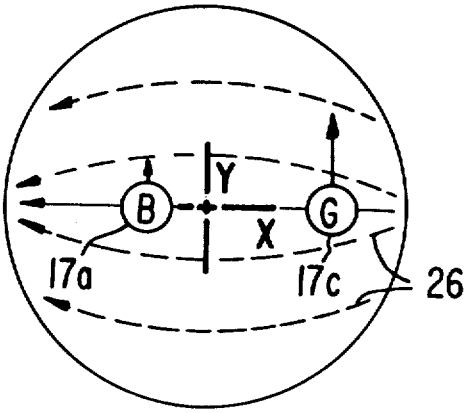

FIG. 4b illustrates the effect of a horizontal misalignment of the beams in the vertical deflection field. Because the green beam is farther from the center axis than is the blue, it is in a stronger portion of the field and hence will be deflected a greater distance vertically than the blue beam. This causes the green raster to be larger in a vertical direction both top and bottom than the blue raster.

It has been shown how misalignment of the electron beams relative to the vertical and horizontal magnetic field causes misconvergence. Horizontal misalignment of the beams causes the rasters to vary in size both vertically and horizontally. Vertical misalignment of the beams causes the rasters formed by the two outside beams to be rotated in opposite directions from each other.

Figure 5:
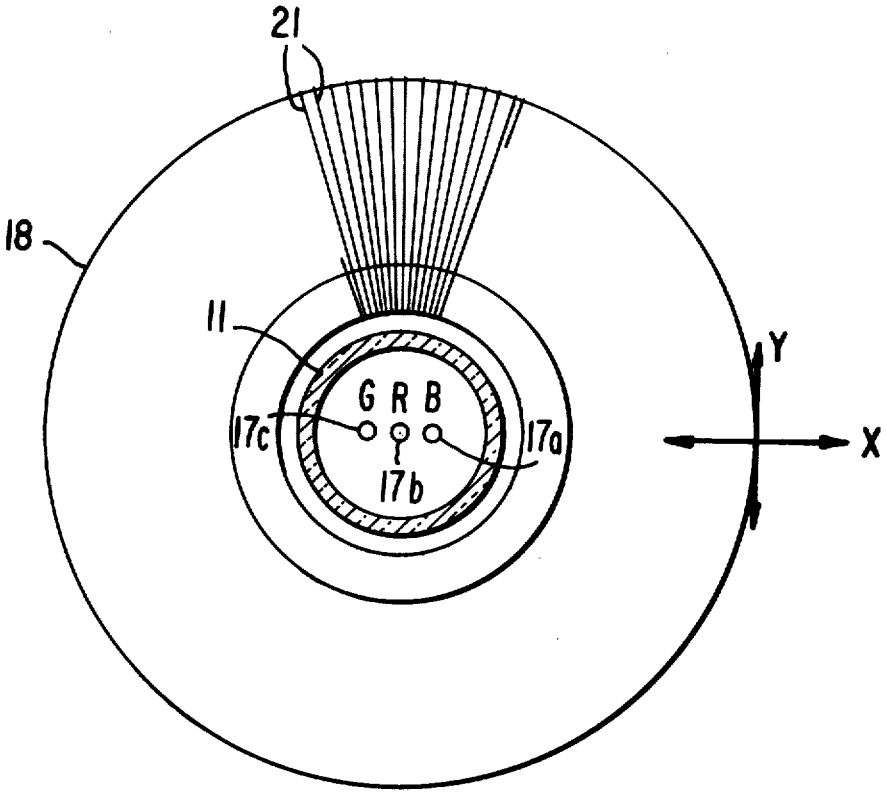
FIG. 5 is a partial cross-sectional view of the deflection yoke and picture tube shown in FIG. 1[.], *taken vertically transverse to the central beam axis of the picture tube; and*

FIG. 5 is a partial cross-sectional view of the deflection and picture tube shown in FIG. 1. In accordance with the invention it has been determined that misconvergence of the beams caused by misalignment of the beams relative to the magnetic field of the deflection yoke can be greatly reduced by positioning the deflection yoke relative to the beams so as to bring the magnetic deflection center of the yoke in alignment with a point halfway between the two outside beams. In FIG. 5 a deflection yoke 18, in this case having conductors 21 only a portion of which are illustrated, toroidally wound about a core is designed such that the smallest inner diameter of the yoke is larger than the outside diameter of the neck portion of the picture tube 11. With such an arrangement the deflection yoke may be shifted laterally in an X and Y direction or in any direction in the X–Y plane so as to cause the magnetic field of the yoke to be aligned with the electron beams to produce substantial convergence of the beams on the phosphor screen. It is important to note that in accordance with a feature of this invention, a deflection yoke in being positioned in the X–Y plane about the picture tube envelope 11 is moved transversely such that the central longitudinal axis of the yoke or central longitudinal axis of the yoke deflection field is aligned with the central beam axis or is parallel thereto. In the past yoke mounts have been provided which permit the yoke to be tilted with respect to the neck of the picture tube such that the yoke would no longer lie in an X–Y plane. This tilting serves to correct for coma in delta gun color television picture tubes which resulted in the blue raster being of different width than the red and green rasters. With such an arrangement dynamic convergence correction of all of the beams was required to properly converge the beams at the phosphor screen. It has been determined that in the arrangement described in FIG. 1, mere tilting of the deflection yoke could result in misregistry of the beams on the phosphor screen. However, by providing the described transverse movement of the entire yoke, the registration of the beams on the color phosphor elements is not disturbed and convergence is achieved without requiring dynamic convergence correction apparatus.

It has been determined that for a color television picture tube such as described in conjunction with FIG. 1 having a viewing screen diagonal of 15 inches, a radial clearance of about 50 mils between the outer diameter of the picture tube neck and the smallest inner diameter of the deflection yoke provides enough clearance for moving the yoke for producing substantial convergence of the beams. It has been determined that for a shift of about 50 mils in a horizontal direction of the yoke resulted in a 50 mil change in the convergence at the horizontal sides of the rasters. Thus, in accordance with the illustrations in FIGS. 3 and 4, a horizontal yoke shift of about 50 mils to the right produces a 50 mil increase in size of the blue raster at each side with respect to the green, as the blue raster size is increased and the green raster size is decreased. For this same horizontal shift the blue raster becomes about 25 mils bigger than the green at the top and bottom of the raster. The sensitivity to vertical shift of the yoke is approximately the same as it is for the described horizontal shift. The changes are such that the blue and green rasters are moved in opposite directions with respect to the red, which itself lies between the blue and green. The convergence changes in the corners as the yoke is moved is a combination of the convergence changes on the adjacent vertical and horizontal axes.

It can be seen that a relatively small shift of the yoke can provide substantial convergence correction. Therefore, it is very desirable that the yoke be rigidly retained in the desired operating position relative to the picture tube. To this end suitable yoke mounting means are provided which allow the yoke to be properly positioned for the best overall convergence condition and then rigidly fixed in position. Several convenient ways of mounting a yoke in the manner described are disclosed in copending U.S. application Ser. No. 217,756, filed Jan. 14, 1972, for T. M. Shrader and entitled "CATHODE RAY TUBE-YOKE PLATFORM-YOKE COMBINATION AND METHOD OF ASSEMBLING THE COMBINATION." In that application one arrangement for mounting the yoke is to permanently bond a mounting platform on the picture tube, permanently attaching a mounting member to the deflection yoke and loosely assembling the yoke mounting member to the platform while the yoke and tube are operated to determine the optimum position for the yoke on the picture tube. When this position is ascertained such as by observing the convergence of the lines of a cross-hatched pattern caused to appear on the picture tube by application of a suitable test signal applied to the television receiver, the yoke mounting member and the platform are rigidly fixed to each other by means of a bonding agent or by mechanical means such as nuts and bolts holding the two pieces together.

The invention is not limited by the particular yoke mounting means provided. It should be noted that any mounting means allowing transverse movement of the entire yoke rather than tilting movement alone and permitting the yoke to be fixedly retained in a desired position is suitable for use with the invention.

The method of aligning the yoke magnetic field with the beams to achieve convergence and the apparatus for holding the yoke permanently in the desired operating position would be utilized during manufacture of the television receiver as the yoke and tube are operated for producing a suitable pattern such as a cross-hatch pattern on the phosphor screen so the operator can observe and determine the optimum placement of the yoke for best convergence.

The invention has been described in the context of a color television display system in which the features of the invention eliminate the need for dynamic convergence correction waveforms and apparatus. However, the invention may also be well utilized with dynamic convergence correction apparatus to supplement the degree of convergence correction of the system or to simplify and reduce the cost of the existing convergence correction system such as by eliminating some or all of the variable control elements or by reducing the number of convergence correction waveform generating circuit components.

What is claimed is:

1. A method of mounting a beam deflection yoke relative to a color picture tube comprising an envelope containing a color phosphor screen, an electron gun assembly for projecting a plurality of electron beams toward said screen and a deflection region for said beams, said method comprising:

supporting said tube in a predetermined position;

temporarily supporting said deflection yoke loosely assembled around said picture tube adjacent said deflection region;

operating said tube and yoke to project said beams toward said screen and to scan said beams in separate rasters on said screen, and simultaneously adjusting the transverse position of said yoke relative to said picture tube while maintaining [substantial] parallelism of the longitudinal axes of said yoke and picture tube to achieve substantial convergence of said beams and coincidence of said rasters on said screen *without the use of dynamic convergence correction means*; and fixedly attaching said yoke to said picture tube in said adjusted position.

2. A method according to claim 1 wherein said electron gun assembly is selected for producing three coplanar in-line beams.

3. A method according to claim 2 wherein said yoke comprises a pair of vertical and a pair of horizontal deflection coils toroidally wound around a core, the conductor winding distribution of said coils being selected for producing positive vertical isotropic astigmatism and negative horizontal isotropic astigmatism.

4. A method according to claim 3 wherein said phosphor screen comprises strips of different color phosphor elements.

5. In a color image display system, the combination comprising:

a color picture tube including an envelope containing a screen of different color phosphor elements and an electron gun assembly disposed within a neck portion of said tube envelope for producing a plurality of beams for impinging on said respective color phosphor elements;

a deflection yoke adapted to be energized to cause said beams to scan respective rasters on said phosphor screen, said yoke having a smallest inner diameter larger than the outer diameter of said neck portion of said tube envelope; and means for mounting said yoke on said picture tube, said means being selected for allowing transverse movement of said yoke relative to said picture tube while maintaining [substantial] parallelism of the central longitudinal axes of said yoke and said picture tube such that said yoke can be fixedly mounted in a position providing substantial convergence of said beams and coincidence of said rasters *without the use of dynamic convergence correction means.*

6. A system for converging a plurality of beams in a color television display system, comprising:

a color picture tube comprising an envelope containing a color phosphor element screen at one end thereof and an electron gun assembly for producing three horizontal coplanar in-line beams disposed within a neck portion of said envelope remote from said screen; *said electron gun assembly including, near that end of the electron gun assembly from which the electron beam exit, at least two adjacent common electrodes, each common electrode having, for each electron beam, a separate aperture, through which the beam passes, so that a selected alignment of the beams relative to one another can be produced;* a deflection yoke having the conductor winding distribution of horizontal and vertical deflection coils thereof selected for producing negative horizontal isotropic astigmatism and positive vertical isotropic astigamatism, said coils being spaced circumferentially around a core and forming a smallest inside diameter of said yoke larger than the outside diameter of said neck portion of said tube envelope; and means for mounting said yoke around said picture tube and including means for allowing movement of said entire yoke in directions substantially normal to the central longitudinal axis of said picture tube and for fixedly retaining said yoke in a position providing substantial convergence of said beams *without the use of dynamic convergence correction means.*

7. A system for converging a plurality of beams according to claim 6 wherein said deflection yoke produces underconvergence of said beams along the horizontal axis of deflection and overconvergence of said beams along the vertical axis of deflection.

8. A system for converging a plurality of beams according to claim 7 wherein said phosphor screen includes a repeating pattern of red, green and blue vertically extending phosphor strips.

*9. A system for converging a plurality of beams in a color television display system, comprising:*

*a color picture tube comprising an envelope containing a color phosphor element screen at one end thereof and an electron gun assembly for producing three horizontal coplanar in-line beams disposed within a neck portion of said envelope remote from said screen; said electron gun assembly including, near that end of the electron gun assembly from which the electron beams exit, at least two adjacent common electrodes, each common electrode having, for each electron beam, a separate aperture, through which the beam passes, the spacing of the apertures of said two adjacent electrodes relative to each other producing a selected alignment of the beams relative to one another;*

*a deflection yoke having the conductor winding distribution of horizontal and vertical deflection coils thereof selected for producing negative horizontal isotropic astigmatism and positive vertical isotropic astigmatism, said coils being spaced circumferentially around a core and forming a smallest inside diameter of said yoke larger than the outside diameter of said neck portion of said tube envelope; and*

*means for mounting said yoke around said picture tube and including means for allowing movement of said entire yoke in directions substantially normal to the central longitudinal axis of said picture tube and for fixedly retaining said yoke in a position providing substantial convergence of said beams without the use of dynamic convergence correction means.*

* * * * *

UNITED STATES PATENT AND TRADEMARK OFFICE

CERTIFICATE OF CORRECTION

PATENT NO. : RE. 31,552

DATED : April 10, 1984

INVENTOR(S) : Robert L. Barbin

It is certified that error appears in the above-identified patent and that said Letters Patent is hereby corrected as shown below:

On the title sheet, the following should be inserted under [56] References Cited, U.S. PATENT DOCUMENTS, -- 3,201,629 - 8/65 - Ammerman --. FOREIGN PATENT DOCUMENTS, -- 447523 - Japan --; -- 876864 - Japan --; -- 1178980 - Great Britain --; -- 6812075 - Holland --;-- 6919591 - Holland -- -- 6901838 - Holland --. OTHER PUBLICATIONS, -- Focusing and Deflection of Beams in Electron Beams Apparatus, Moscow Soviet Radio Publishers (1967) pp. 214-217 --; -- NHK Technical Study, Vol. 17, No. 6 (1965) --; -- Focusing and Adjustment of Beams in Electron Tubes by BEBonskin et al., Moscow Soviet Radio Publishers (1967) pp. 89-90 --.

Signed and Sealed this

*Seventh* Day of *August 1984*

[SEAL]

*Attest:*

GERALD J. MOSSINGHOFF

*Attesting Officer*

*Commissioner of Patents and Trademarks*